(12) United States Patent
Komatsuki et al.

(10) Patent No.: US 6,445,567 B1
(45) Date of Patent: Sep. 3, 2002

(54) CAP MEMBER FOR ELECTRICAL DOUBLE LAYER CAPACITOR CONTAINER

(75) Inventors: Masato Komatsuki; Toshiyuki Matsuoka, both of Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/067,253

(22) Filed: Feb. 7, 2002

(30) Foreign Application Priority Data

Feb. 8, 2001 (JP) ........................................ 2001-032566

(51) Int. Cl.⁷ ............................. H01G 9/10; H01G 4/228
(52) U.S. Cl. ........................ 361/518; 361/519; 361/520
(58) Field of Search .......................... 361/502, 517, 361/518, 519, 520, 535, 536, 537, 538

(56) References Cited

U.S. PATENT DOCUMENTS

| | | | |
|---|---|---|---|
| 3,866,095 A | * 2/1975 | Marmorek | 174/50.57 |
| 4,760,494 A | * 7/1988 | Crum | 361/272 |
| 5,847,919 A | * 12/1998 | Shimizu et al. | 361/303 |
| 6,327,137 B1 | * 12/2001 | Yamamoto et al. | 361/216 |

FOREIGN PATENT DOCUMENTS

JP          2000-21684 A       1/2000

* cited by examiner

Primary Examiner—Anthony Dinkins
(74) Attorney, Agent, or Firm—Sughrue Mion, PLLC (57) ABSTRACT

A cap member 4 having electrode terminals 10, 11 which are arranged in an opening 2a, and an insulating seal member 12 insert-molded between both the electrode terminals 10, 11. The electrode terminals 10, 11 are provided with ribs 14, 17, and chemically bond to the layer of an organic compound formed on the surface of the terminals 10, 11. The bottom surface of the rib 17 is placed upwardly of the bottom surface of the rib 14. The resin-molded article 12 contains therein the ribs 14 and 17 formed on both the electrode terminals 10, 11 and chemically bonds to the organic compound layers formed on the surfaces of both the electrode terminals 10, 11.

8 Claims, 4 Drawing Sheets

CAP MEMBER FOR ELECTRICAL DOUBLE LAYER CAPACITOR CONTAINER

BACKGROUND OF THE INVENTION

1. Field of the Invention

The present invention relates to a cap member for an electrical double layer capacitor container.

2. Description of the Related Art

In recent years, electrical double layer capacitors of high capacity and high output have received attention as car-mounted electric power sources for driving cars.

There is known electrical double layer capacitors in which electrode elements are impregnated with an electrolytic solution and housed into a bottom-closed tubular container. The electrode elements have a positive electrode and a negative electrode oppositely placed on opposite sides of separators, wherein the positive electrode and the negative electrode are of solid electrodes including activated carbon and the like as a main ingredient and formed on the surfaces of current-collecting members of metal foil and the like.

In the above electric double layer capacitor, a highly wetting organic electrolytic solution is used in order to heighten electrode density when the above active carbon is impregnated with the above electrolytic solution. As such an organic electrolytic solution, a solution wherein a quaternary ammonium salt is dissolved in an organic solvent such as polycarbonate is used, for example.

Furthermore, in the electrical double layer capacitors, there is known a capacitor having such a configuration that the opening of the container is sealed by a cap member having a pair of electrode terminals connected to the respective electrodes. For example, Japanese Patent Application Laid-open No. 2000-21684 discloses a cap member for an electrical double layer capacitor comprising an insulating seal member formed by insert molding of a synthetic resin in between a metallic member provided with a through hole in the inner peripheral side and a pair of electrode terminals passing into the through hole. The cap member described in the application is ultra-sonic welded to the opening of a bottom-closed tubular container, thereby shielding and capping the opening.

However, the cap member is shrunk during solidification by cooling of a synthetic resin insert-molded. Therefore, this method has a disadvantage of a reduction in adhesion between the insulating seal member formed and the metallic member or the electrode terminal surface. The reduced adhesion results in a fear that when the inside of the electrical double layer capacitor becomes high pressured by the evolution of gas and the like, the organic electrolytic solution having high wettability may leak outside from a gap between the insulating seal member and the metallic member or the electrode terminal.

SUMMARY OF THE INVENTION

The present invention has an object to resolve such disadvantages and to provide a cap member for an electrical double layer capacitor permitting securely preventing of electrolytic solution therein from leaking to the outside even when the electrolytic solution is of high wettability.

In order to achieve this object, an aspect of the present invention is directed to a cap member for an electrical double layer capacitor which shields and caps an opening of a bottom-closed tubular container housing electrode elements of a positive electrode and a negative electrode impregnated with an electrolytic solution and oppositely placed via a separator and which has a pair of electrode terminals connected to each of the electrodes, said cap member comprising a first electrode terminal which is in the form of a hollow tube and arranged in the outer peripheral side of the opening, a second electrode terminal which is arranged via a predetermined space in the inner peripheral side of the first electrode terminal, and an insulating seal member consisting of a resin-molded article including glass fibers of small pieces inserted and formed between both the electrode terminals, wherein the first electrode terminal has a rib projecting downward from its bottom surface and extending in the axial direction of the container and chemically bonds to an organic compound layer formed on the surface of the first terminal, the second electrode terminal has a rib projecting upwardly from its bottom surface and extending in the axial direction of the container and chemically bonds to an organic compound layer formed on the surface of the second terminal, the bottom surface of the rib of the second electrode terminal is positioned above the bottom surface of the rib of the first electrode terminal, and the resin-molded article contains therein the ribs formed on both the electrode terminals and chemically bonds to the organic compound layers formed on the surfaces of both the electrode terminals.

In the cap member according to the present invention, there is a fear of a reduction in adhesion between the insulating seal member and both the electrode terminals because a resin injected in the molten state shrinks during solidification by cooling thereof.

Here, the shrinking force of the resin-molded article forming the insulating seal member largely acts in the radius direction of the first electrode terminal in the form of a hollow tube, that is, in the direction orthogonal to the axial direction of the container. For this reason, in the cap member according to the present invention, the electrode terminals each are provided with the ribs projecting downward from the respective bottom surfaces and extending in the axial direction of the container, and the resin-molded article is formed to contain therein the ribs formed on both the electrode terminals. As a result, according to the cap member of the present invention, the rib works against the shrinking force of the resin-molded article, thereby permitting the prevention of a reduction in adhesion between the insulating seal member and both the electrode terminals.

Furthermore, in the cap member according to the present invention, both the electrode terminals chemically bond to the organic compound layers formed on their respective surfaces, and the resin-molded article chemically bonds to the organic compound layer. As a result, in the cap member according to the present invention, excellent adhesion can be provided between the insulating seal member and both the electrode terminals through the medium of the organic compound layers to which each of them chemically bonds as described above.

As the above organic compound layer, the layer comprising a silane coupling agent or a triazinethiol derivative may be mentioned.

On the other hand, in order to be chemically bonded to the above organic compound layer, the above resin-molded article is preferably made of one resin selected from the group consisting of a nylon, an acrylonitrile-butadiene-styrene copolymer resin, polybutylene terephthalate, polyphenylene sulfide, polyphenylene oxide, an epoxy resin, and a phenol resin.

According to the cap member of the present invention, it is possible to prevent a reduction in adhesion between the insulating seal element and both the electrode terminals to hold excellent adhesion between them. Therefore, in the case of using an organic electrolytic solution of high wettability, it is possible to securely prevent the organic electrolytic solution from leaking.

Furthermore, in the cap member according to the present invention, it is characterized that the resin-molded article is formed by insert molding comprising the steps of placing a mold having an inner surface shape coincident with the outside shape of the insulating seal member and the second electrode terminal in the inner peripheral side of the first electrode terminal, injecting a molten resin from a gate provided on the surface facing the second electrode terminal in the inner peripheral side of the mold into the mold, entering the injected resin along the surface of the inner peripheral side of the mold into the side of the second electrode terminal, guiding the resin hitting the bottom surface of the second electrode terminal to the rib of the second electrode terminal for the resin to backwardly flow in the direction of the gate, guiding the resin hitting the bottom surface of the gate side of the mold to the rib of the first electrode terminal for the resin to flow between both the electrode terminals, and allowing a part of the resin hitting the bottom surface of the gate side of the mold to flow in the outer peripheral side of the rib of the first electrode terminal.

In the insert molding, the cap member according to the present invention has the bottom surface of the rib of the second electrode terminal positioned upwardly of the bottom surface of the rib of the first electrode terminal. Therefore, the molten resin is easy to flow into behind the rib of the second electrode terminal when viewed from the flowing-in direction of the resin, that is, in the side of the first electrode terminal, thereby permitting easy molding of the insulating seal member.

Further, in the cap member according to the present invention, during insert molding of the insulating seal member as described above, the resin injected in the molten state is guided by the rib to snake upward and downward in the axial direction of the container as described above. As a result, in the resin-molded article configuring the insulating seal member, the contained glass fibers of small pieces is oriented in the direction almost parallel to the axial direction of the container. Therefore, in the cap member according to the present invention, the glass fibers of small pieces oriented as described above cause a force acting against the shrinking force of the resin-molded article, thereby permitting prevention of a reduction in adhesion between the insulating seal member and both the electrode terminals.

Although the cap member according to the present invention is fixed to the outer peripheral side of the opening of the bottom-closed tubular container via the first electrode terminal, thus capping the opening, at this time, the electrode terminal is welded to the opening by laser welding and the like. Therefore, the cap member of the present invention is characterized in that when the first electrode terminal is welded to the opening of the bottom-closed tubular container, the resin-molded article is formed so that a space is left between its end portion facing the side wall of the bottom-closed tubular container, and the welded portion of the electrode terminal and the opening.

As described above, the cap member according to the present invention has a space between the end portion of the resin-molded article and the side wall of the bottom-closed tubular container, and therefore it is possible to prevent the heat generated by the laser welding and the like from degrading the resin-molded article configuring the insulating seal member. Therefore, in the cap member according to the present invention, the insulating seal member and both the electrode terminals can hold excellent adhesion to each other.

DETAILED DESCRIPTION OF THE PREFERRED EMBODIMENT

Figure 1:
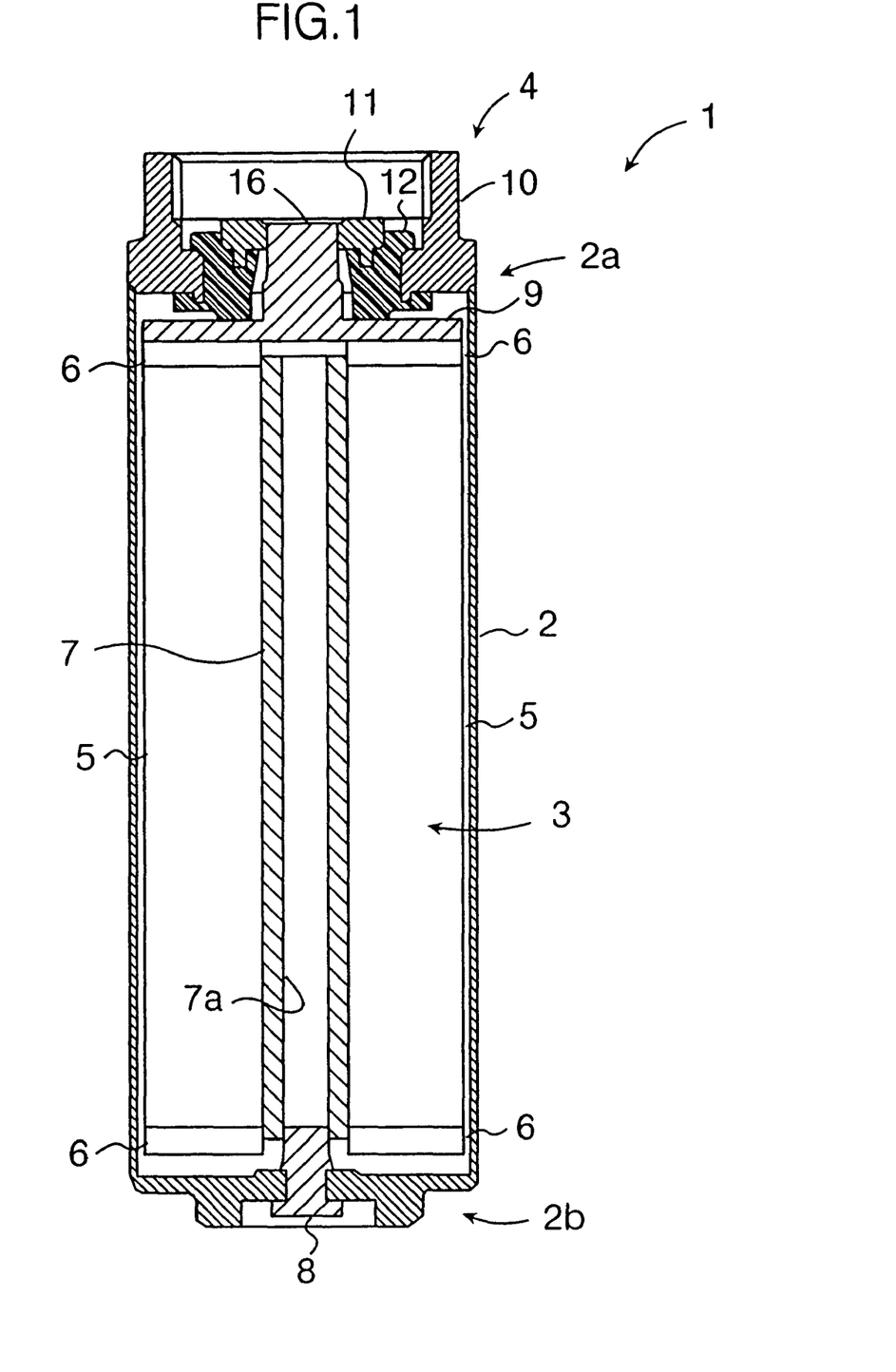
FIG. 1 is an illustrative cross-sectional view of an electrical double layer capacitor provided with a cap member of one aspect of the present invention.

As shown in FIG. 1, an electrical double layer capacitor 1 is configured such that an electrode element 3 impregnated with an organic electrolytic solution is housed in a bottom-closed tubular container 2 of metal or alloy and the opening portion 2a of the bottom-closed tubular container 2 is hermetically sealed with a cap member 4.

The electrode element 3 comprises a positive electrode and a negative electrode oppositely placing a pair of electrodes 5, 5 on opposite sides of a separator 6, which electrodes 5, 5 are made by forming a layer of activated carbon (not shown) on a current-collecting element (not shown). The electrode element 3 is formed by winding the electrodes 5, 5 and the separator 6 together around a core 7.

The core 7 is hollow, and is mounted to the bottom portion 2b of the bottom-closed tubular container 2 by an insulating mounting member 8 screwed into a hollow portion 7a. Although not shown, the current-collecting element is connected to a positive electrode connection member 9 in the positive electrode side and is connected to the bottom portion 2b of the bottom-closed tubular container 2 in the negative electrode side.

The activated carbon configuring the electrode 5 increases the electrode density of the electrical double layer capacitor when the organic electrolytic solution is used, and thus the organic electrolytic solution preferably increases static capacity density per unit volume. For this reason, the activated carbon has the mode of a pore distribution by a TEM image analysis method in the range from 7–25 Å.

For the activated carbon, as pores smaller than 7 Å in diameter increase, the adsorption amount of ions in the organic electrolytic solution decreases and thus the static capacity of the electrical double layer capacitor becomes smaller. Further, as pores larger than 25 Å in diameter increase, the static capacity density per volume decreases.

Furthermore, the activated carbon used has the relative surface area preferably in the range from 500 to 3000 $m^2/g$, and more preferably in the range 600 to 1500 $m^2/g$. If the relative surface area is out of the above range, sufficient static capacity may be not obtained.

The activated carbon is mixed with a bonding agent and, if desired, a conducting agent, kneaded with ethanol dropped and rolled into a sheet-like electrode. The electrode 5 can be manufactured by bonding and integrating the sheet-like electrode to both the surfaces of the current-collecting element made of foil and mesh of aluminum, stainless steel and the like with an electroconductive adhesive.

The above electrode 5 may be produced by coating both the sides of the above collector with a slurry obtainable by dispersing, into a solvent, a mixture of the above active carbon, a binder, and a conductive agent which is optionally mixed, followed by drying.

As the above binder, for example, polyvinylidene fluoride, polytetrafluoroethylene, a polyimide resin, a polyimideamide resin can be used. Moreover, as the above conductive agent, for example a material having a high electric conductivity such as carbon black or carbon whisker can be used.

The above separator may be any of porous bodies which are permeable by ions present in the above organic electrolytic solution. Examples of such porous bodies include microporous polyethylene film, microporous polypropylene film, polyethylene nonwoven cloth, glass fiber-mixed nonwoven cloth, glass mat filter, cellulose nonwoven cloth, rayon nonwoven cloth, and the like.

As the organic electrolytic solution, it is preferable to use a highly wetting solution in order to attain a high electrode density when the above active carbon is impregnated with the above electrolytic solution and an electric double layer is formed by penetration of the solution into pores of the active carbon. As such a highly wetting organic electrolytic solution, a solution wherein a quaternary onium salt is dissolved in an organic solvent can be used.

As the above quaternary onium salt, any one of salts formed from quaternary onium cations such as quaternary ammonium ions or quaternary phosphonium ions and anions such as $BF_4^-$, $PF_5^-$, $SO_3CF_3^-$, $AsF_6^-$, $N(SO_2CF_3)_2^-$, or $ClO_4^-$ or any mixture of two or more of the salts can be used. As the above organic solvent, there can be used a cyclic carbonate such as ethylene carbonate, propylene carbonate, or butylene carbonate; a linear carbonate such as dimethyl carbonate, ethyl methyl carbonate, or diethyl carbonate; a lactone such as γ-butyrolactone; sulfolane or a sulfolane derivative; or the like.

Figure 2:
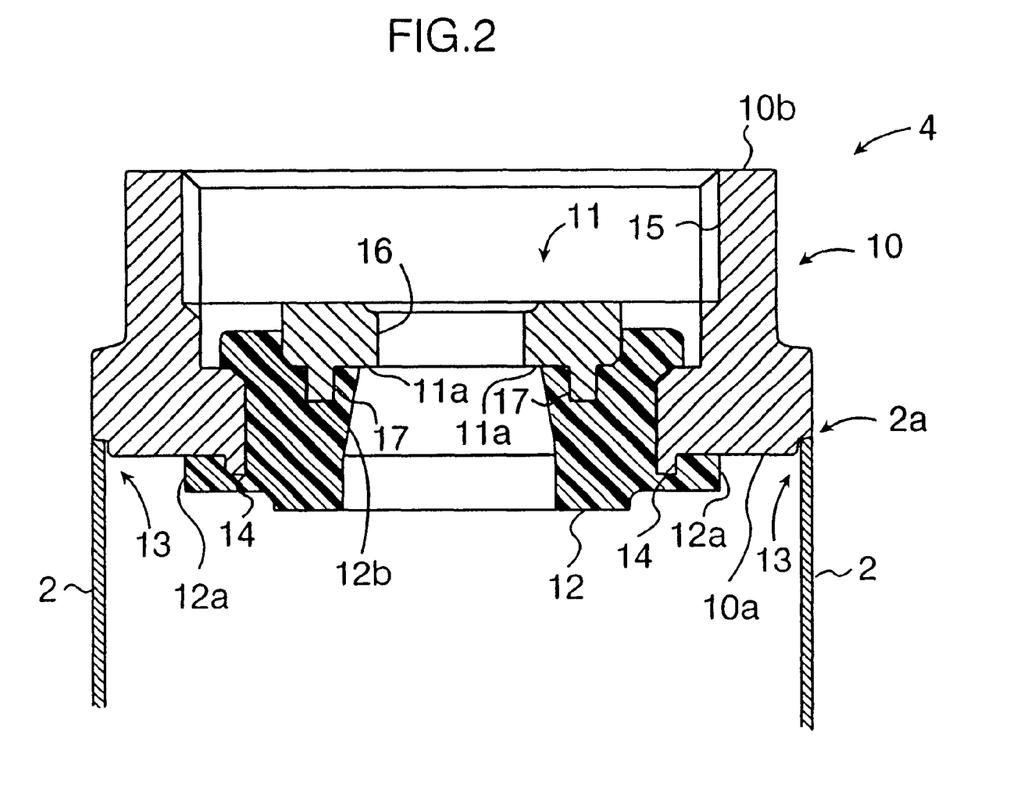
FIG. 2 is an enlarged view of the main portion of FIG. 1.

As shown in FIG. 2, the cap member 4 is provided with a negative electrode terminal 10 which is in the form of a hollow tube and arranged on the outer peripheral side of the opening 2 a, and a positive electrode terminal 11 which is arranged via a predetermined space in the inner peripheral side of the negative electrode terminal 10. Further, the insulating seal member 12 is formed between both the terminals 10, 11. The insulating seal member 12 is made of synthetic resin-molded article including glass fibers of small pieces.

The negative electrode terminal 10 is provided with a ring-shaped recess portion 13 on the outer peripheral side of the bottom surface 10a, and is fitted into the opening 2a of the bottom-closed tubular container 2 by the recess portion 13, and is then welded and joined to the bottom-closed tubular container 2 by laser welding. At this time, the insulating seal member 12 is positioned inwardly of the ring-shaped recess 13 through which the negative electrode terminal 10 is welded to the opening 2a, and the end portion 12a is formed via a space between it and the side-wall of the bottom-closed tubular container 2. As a result, the insulating seal member 12 does not directly undergo heat caused by the laser welding due to the space, thereby permitting prevention of degradation of the synthetic resin-molded article.

Furthermore, the negative electrode terminal 10 is provided with a rib 14 projecting downward from its bottom surface 10a and extending in the axial direction of the container 2, and has a female thread portion 15 formed on the inner peripheral surface of the top portion 10b thereof, wherein a bus bar (not shown) is screwed into the female thread 15 as an external terminal. The bus bar is provided with a negative electrode terminal in the shape of a hollow tube on the external peripheral side thereof, and a positive electrode terminal in the shape of a solid cylinder and provided via an insulating member in the inner peripheral side of the negative electrode terminal. Further, the bus bar is screwed into t he female thread 15 formed on the negative electrode terminal 10 of the cap member 4 by the male thread portion formed on the outer peripheral surface of the negative electrode terminal, thereby connecting to the negative electrode terminal 10. Moreover, when the bus bar is screwed into the female thread 15, the end face of the positive electrode terminal in the shape of a solid cylinder makes contact with the positive electrode terminal 11 of the cap member 4, thereby connecting the bus bar to the positive electrode terminal 11.

Therefore, the upper end portion of the positive electrode terminal 11 of the cap member 4 is placed to project upwardly of the lower end portion of the female thread portion 15 formed on the negative electrode terminal 10. The positive electrode terminal 11 is provided with a through hole 16, and a positive electrode connection member 9 is fitted on the inner peripheral side of the through hole. Moreover, the positive electrode terminal 11 has a rib 17 projecting downward from the bottom surface 11a thereof and extending in the axial direction of the container 2. Further, the rib 17 has its bottom surface placed upward of the bottom surface of the rib 14 formed in the negative electrode terminal 10.

Figure 3:
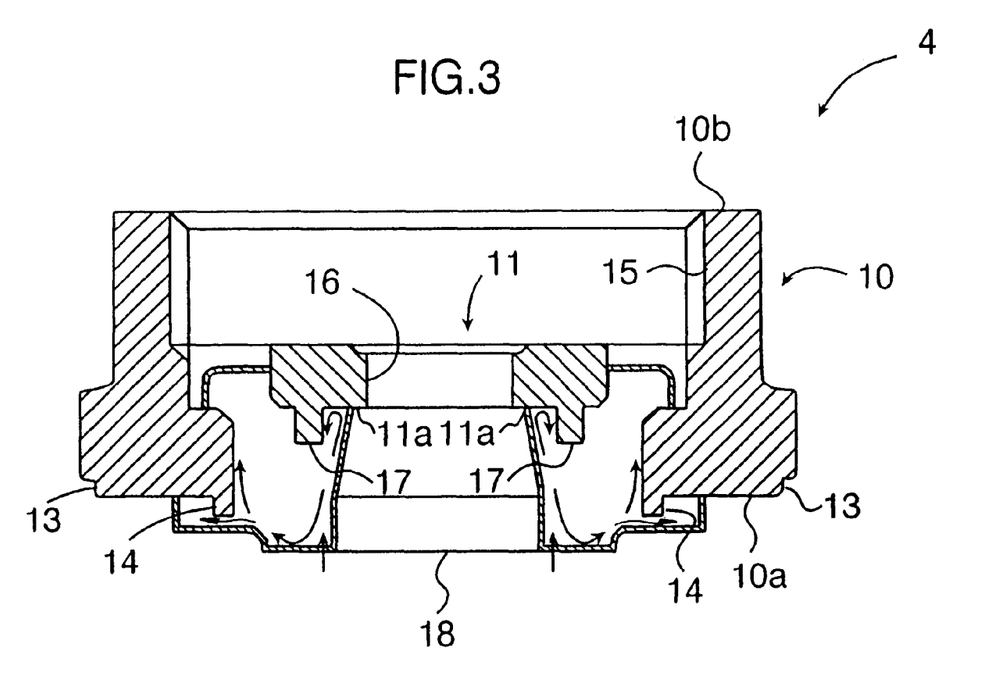
FIG. 3 is an illustrative cross-sectional view showing a method of manufacturing the cap member shown in FIG. 1.

The insulating seal member 12 is formed by insert molding of a synthetic resin including glass fibers of small pieces, and is provided with, in the inner peripheral side, a through hole 12b linking the through hole 16 of the positive electrode terminal 11. As shown in FIG. 3, the insert molding is performed such that a metal mold 18 provided with an inner surface shape coincident with the outside shape of the insulating seal member 12 and the positive electrode terminal 11 are placed in the inner peripheral side of the negative electrode terminal 10, and a molten resin is injected into the metal mold 18 from a gate (not shown) provided on the surface facing the positive electrode terminal 11 of the inner peripheral side of the metal mold 18. At this time, a portion including the rib 14 of the negative electrode terminal 10 and a portion including the rib 17 of the positive electrode terminal 11 are exposed in the interior of the metal mold 18. Therefore, the insulating seal member 12 formed by solidification by cooling of the resin injected into the metal mold 18 includes the ribs 14, 17 therein, and joints them to the negative electrode terminal 10 and the positive electrode terminal 11.

When the insert molding is performed as described hereinbefore, the resin injected from the gate, as shown by arrows in FIG. 3, runs into the side of the positive electrode terminal 11 along the surface of the inner peripheral side of the metal mold 18 (the surface forming the through hole 12b in the insulating seal member 12), and hits the bottom surface 11a of the positive electrode terminal 11, and then is guided by the rib 17 to backward flow in the direction of the gate. Then, the resin hits the surface of the gate side of the metal mold 18 and is then guided by the rib 14 to flow in between the negative electrode terminal 10 and the positive electrode terminal 11. In addition, a part of the resin flows into the outer peripheral side of the rib 14.

At this time, since the bottom surface of the rib 17 is positioned upwardly of the bottom surface of the rib 14, the resin guided by the rib 17 and backward flowing in the direction of the gate 17 can easily flow in between the negative electrode terminal 10 and the positive electrode terminal 11. As a result, the insulating seal member 12 having the above-described shape can be formed ideally.

Furthermore, the resin injected in the metal mold 18 is guided by the ribs 14, 17 to snake upward and downward as shown by arrows in FIG. 3, so that the glass fibers of small pieces included in the resin is easily orientated in the axial direction of the container 2 along the flow of the resin snaking as mentioned above.

After injected in the metal mold 18, the resin is subjected to the large action of shrinking force toward the inner peripheral direction during solidification by cooling thereof. However, in the cap member 4, the ribs 14, 17 extending in the axial direction of the container 2 as described above and the small pieces of glass fibers orientated in the axial direction of the container 2 as described above act against the shrinking force of the resin. Therefore, in the cap member 4, the insulating seal member 12 can hold excellent adhesion between the negative electrode terminal 10 and the positive electrode terminal 11.

Further, layers of an organic compound (not shown) forming chemical bonds with the negative electrode terminal 10 and the positive electrode terminal 11 are formed on the portions of the negative electrode terminal 10 and the positive electrode terminal 11 exposed in the metal mold 18. The organic compound layers are also able to form chemical bonds with the resin injected in the metal mold 18. As a result, the insulating seal member 12 is chemically coupled to the negative electrode terminal 10 and the positive electrode terminal 11 through the layer of the organic compound, whereby excellent adhesion can be obtained between the insulating seal member 12 and the negative electrode terminal 10, and between the insulating seal member 12 and the positive electrode terminal 11.

As an organic compound forming the above organic compound layer, a silane coupling agent or a triazinethiol derivative may be mentioned. The above silane coupling agent and triazinethiol derivative are convenient because the compounds do not react even when they come into contact with the above organic electrolytic solution with which the electrode element 3 is impregnated.

The above-mentioned silane coupling agent includes vinyltriethoxysilane, vinyltris(2-methoxyethoxysilane), 3-methacryloxypropyltrimethoxysilane, 3-glycidoxypropyltrimethoxysilane, 2-(3,4-epoxycyclohexyl)ethyltrimethoxysilane, N-2-(aminoethyl)-3-aminopropyltrimethoxysilane, N-2-(aminoethyl)-3-aminopropylmethyldimethoxysilane, 3-aminopropyltrimethoxysilane, N-phenyl-3-aminopropyltrimethoxysilane, 3-mercaptopropyltrimethoxysilane, 3-chloropropyltrimethoxysilane, N-imidazolemethyltrimethoxysilane, N-imidazolemethyltriethoxysilane, 2-(N-imidazole)ethyltrimethoxysilane, 2-(N-imidazole)ethyltriethoxysilane, 3-(N-imidazole)propyltrimethoxysilane, 3-(N-imidazole)propyltriethoxysilane, N-2-methylimidazolemethyltrimethoxysilane, N-2-isopropylimidazolemethyltrimethoxysilane, N-2-ethyl-4-methylimidazolemethyltrimethoxysilane, and the like. In addition, as available agents of silane coupling agent aqueous solutions, Parcoat 3751 (a trade name) and Parcoat 3841 (a trade name) manufactured by Nihon Parkerizing Co., Ltd. and the like can be used.

The above-mentioned midazole silane compounds have high heat resistance. Therefore, even after high temperature drying performed to remove moisture in the container 2 after construction of the electrical double layer capacitor shown in FIG. 1, excellent adhesion can be held between the insulating seal member 12 and the negative electrode terminal 10 and between the insulating seal member 12 and the positive electrode terminal 11.

In order to form a layer of a silane coupling agent on the surfaces of the negative electrode terminal 10 and the positive electrode terminal, after cleaning and drying of the surfaces of the negative electrode terminal 10 and the positive electrode terminal 11, then the negative electrode terminal 10 and the positive electrode terminal 11 are dipped in an aqueous solution of a silane coupling agent at room temperature for several seconds to several minutes. Then, the negative electrode terminal 10 and the positive electrode terminal 11 are pulled out from the aqueous solution of the silane coupling agent and dried without rinsing.

Shiran coupling agents form a layer of an amorphous organic metal compound between the insulating seal member 12 and the negative electrode terminal 10 and between the insulating seal member 12 and the positive electrode terminal 11. The layer of the amorphous organic metal compound is formed primarily by siloxane bonding, and bonds to the metal surface of the negative electrode terminal 10 and the positive electrode terminal 11, based on chemical bonds. Further, the amorphous organic metal compound layer is considered to bond to the resin forming the insulating seal member 12 by the reaction of alkoxy groups.

The above-mentioned triazinethiol derivative includes the compounds such as 1,3,5-triazine-2,4,6-trithiol, 1,3,5-triazine-2,4,6-trithiol monosodium, 1,3,5-triazinean-2,4,6-trithiol triethanolamine, 1,3,5-triazine-2,4,6-trithiol di(tetrabutylammonium salt), 6-anilino-1,3,5-triazine-2,4-dithiol, 6-anilino-1,3,5-triazine-2,4-dithiol monosodium, 6-dibutylamino-1,3,5-triazine-2,4-dithiol, 6-dibutylamino-1,3,5-triazine-2,4-dithiol monosodium, 6-dibutylamino-1,3,5-triazine-2,4-dithiol di(tetrabutylammonium salt), 6-diallylamino-1,3,5-triazine-2,4-dithiol, 6-diallylamino-1,3,5-triazine-2,4-dithiol monosodium, 6-dioctylamino-1,3,5-triazine-2,4-dithiol, 6-dioctylamino-1,3,5-triazine-2,4-dithiol monosodium, 6-dilaurylamino-1,3,5-triazine-2,4-dithiol, 6-dilaurylamino-1,3,5-triazine-2,4-dithiol monosodium, 6-stearylamino-1,3,5-triazine-2,4-dithiol, 6-stearylamino-1,3,5-triazine-2,4-dithiol monopotassium, 6-oleylamino-1,3,5-triazine-2,4-dithiol, and 6-oleylamino-1,3,5-triazine-2,4-dithiol monopotassium. For forming the above triazinethiol derivative layer on the surfaces of the negative electrode terminal 10 and positive electrode terminal 11, using an aqueous solution of a triazinethiol derivative as an electrodeposition solution, the negative electrode terminal 10 or positive electrode terminal 11 as a positive electrode, and a platinum plate, a titanium plate or a carbon plate as a negative electrode, a high-speed treatment at a low temperature is carried out by passing an electric current between both the electrodes.

Aluminum, aluminum alloy, copper, stainless steel, iron, nickel, titanium, tantalum, and the like can be used for the negative electrode terminal 10 and the positive electrode terminal 11 because these materials make chemical bonds with silane coupling agents or triazine thiol derivatives. Aluminum or aluminum alloy can be suitably used for the negative electrode terminal 10 and the positive electrode terminal 11 because of the excellent affinity of aluminum and aluminum alloy to triazine thiol derivatives or silane coupling agents.

Furthermore, for the insulating seal member 12, there can be used a nylon, an acrylonitrile-butadiene-styrene copolymer resin (ABS), polybutylene terephthalate (PBT), polyphenylene sulfide (PPS), polyphenylene oxide (PPO), an epoxy resin, a phenol resin or the like, because each of these materials makes a chemical bond with a silane coupling agent or a triazine thiol derivative. For the insulating seal member 12, the PPS, the epoxy resin or the phenol resin can be suitably used, because of its excellent heat resistance.

Next, the cap member 4 (working example) was produced by using the negative electrode terminal 10 and the positive electrode terminal 11 of which surfaces have an organic compound layer formed by using available silane coupling agents, and by forming the insulating seal member 12 in between the negative electrode terminal 10 and the positive electrode terminal 11 by insert molding of polyphenylene sulfide including glass fibers. Next, the negative electrode terminal 10 was welded to the opening 2a of the container 2 by laser welding to fix the cap member 4 to the container 2, thereby configuring the electrical double layer capacitor 1 shown in FIG. 1. Then, by applying hydraulic pressure to the base portion and measuring the pressure at which the cap member 4 was broken, the strength of withstand pressure was determined.

Next, the cap member 4 (comparative example 1) was formed by using the negative electrode terminal 10 and the positive electrode terminal 11 not provided with the ribs 14, 17 and by forming the insulating seal member 12 in between the negative electrode terminal 10 and the positive electrode terminal 11 by insert molding of polyphenylene sulfide not including glass fibers. Then, the strength of withstand pressure was measured on the cap member 4 of comparative example 1 in the same manner as in the working example. When the strength of withstand pressure of the cap member 4 of the comparative example 1 was assumed to be 100, the strength of withstand pressure of the cap member 4 of the present working example was 130.

Next, the cap member 4 (comparative example 2) was formed by using the negative electrode terminal 10 and the positive electrode terminal 11 not provided with the ribs 14 and 17 and by forming the insulating seal member 12 in between the negative electrode terminal 10 and the positive electrode terminal 11 by insert molding of polyphenylene sulfide including glass fibers. Then, the strength of withstand pressure was measured on the cap member 4 of comparative example 2 in the same manner as in the working example. The strength of withstand pressure of the cap member 4 of the comparative example 2 was 110 when that of the comparative example 1 was assumed to be 100.

Next, the cap member 4 (comparative example 3) is formed by using the negative electrode terminal 10 and the positive electrode terminal 11 provided with the ribs 14, 17 and by forming the insulating seal member 12 in between the negative electrode terminal 10 and the positive electrode terminal 11 by insert molding of polyphenylene sulfide not including glass fibers. Then, the strength of withstand pressure was measured on the cap member 4 of comparative example 3 in the same manner as in the working example. The strength of withstand pressure of the cap member 4 of the comparative example 3 was 120 when that of the comparative example 1 was assumed to be 100.

From the working example and the comparative examples, it is clear that the excellent strength of withstand pressure can be provided by the cap member 4 of the working example.

Figure 4:
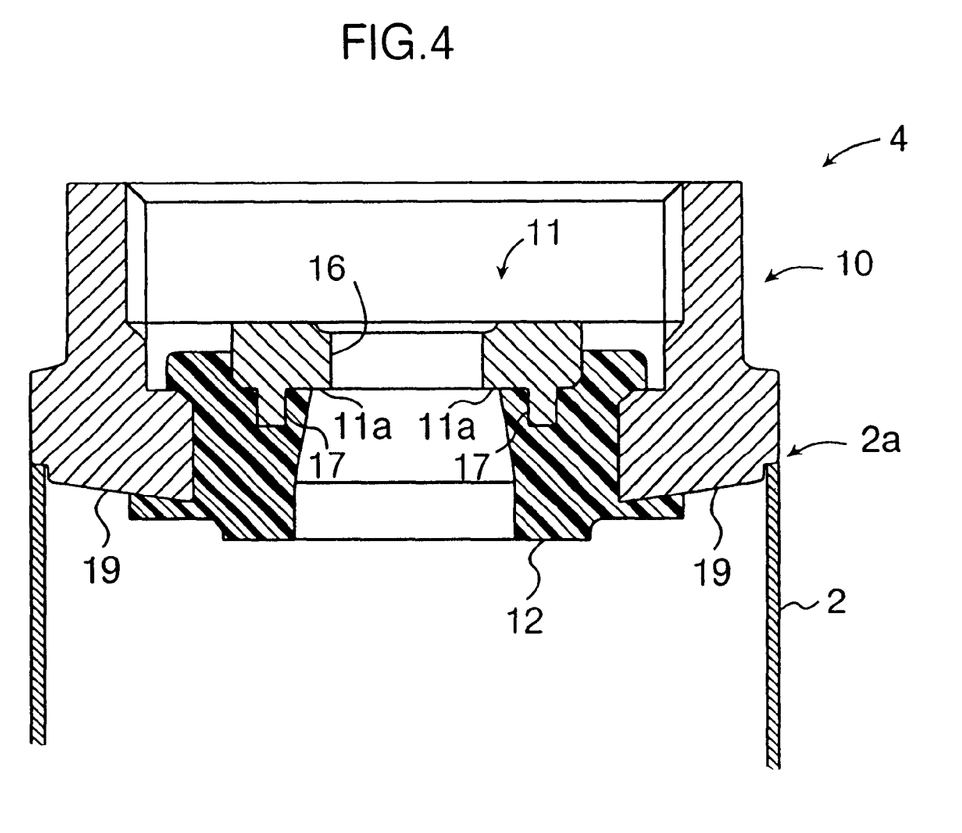
FIG. 4 is an illustrative cross-sectional view showing the enlarged main portion of a cap member of another aspect of the present invention.

By the way, although the cap member 4 according to the present embodiment is configured to be provided with the ribs 14, 17 on the negative electrode terminal 10 and the positive electrode terminal 11, it is possible to provide a tapered portion 19 gradually increasing in diameter from the inner peripheral side toward the outer peripheral side, instead of the rib 14, as shown in FIG. 4. The tapered portion 19 can act against shrinking force during solidification by cooling of the resin to provide the effect of holding the excellent adhesion between the insulating seal member 12 and the negative electrode terminal 10 and between the insulating seal member 12 and the positive electrode terminal 11. Further, although FIG. 4 shows the rib 14 of FIG. 2 is replaced with the tapered portion 19, the rib 17 may be replaced with a tapered portion gradually increasing in diameter from the inner peripheral side toward the outer peripheral side.

What is claimed is:

1. A cap member for an electrical double layer capacitor which shields and caps an opening of a bottom-closed tubular container housing electrode elements of a positive electrode and a negative electrode impregnated with an electrolytic solution and oppositely placed via a separator and which has a pair of electrode terminals connected to each of the electrodes, said cap member comprising:

a first electrode terminal which is in the form of a hollow tube and arranged in the outer peripheral side of the opening;

a second electrode terminal which is arranged with a predetermined space in the inner peripheral side of the first electrode terminal; and an insulating seal member consisting of a resin-molded article including glass fibers of small pieces inserted and formed between both the electrode terminals; wherein the first electrode terminal has a rib projecting downward from its bottom surface and extending in the axial direction of the container and chemically bonds to an organic compound layer formed on the surface of the first terminal;

the second electrode terminal has a rib projecting upwardly from its bottom surface and extending in the axial direction of the container and chemically bonds to an organic compound layer formed on the surface of the second terminal;

the bottom surface of the rib of the second electrode terminal is positioned above the bottom surface of the rib of the first electrode terminal; and the resin-molded article contains therein the ribs formed on both the electrode terminals and chemically bonds to the organic compound layers formed on the surfaces of both the electrode terminals.

2. A cap member for the electrical double layer capacitor according to claim 1, wherein the organic compound layer comprises a silane coupling agent.

3. A cap member for the electrical double layer capacitor according to claim 1, wherein the organic compound layer comprises a triazinethiol silane coupling agent.

4. A cap member for the electrical double layer capacitor according to claim 1, wherein the resin-molded article is made of one resin selected from the group consisting of a nylon, an acrylonitrile-butadiene-styrene copolymer resin, polybutylene terephthalate, polyphenylene sulfide, polyphenylene oxide, an epoxy resin, and a phenol resin.

5. A cap member for the electrical double layer capacitor according to claim 4, wherein the resin-molded article is made of one resin selected from the group consisting of polyphenylene sulfide, an epoxy resin, and a phenol resin.

6. A cap member for the electrical double layer capacitor according to claim 1, wherein the resin-molded article is formed by insert molding comprising the steps of placing a mold having an inner surface shape coincident with the outside shape of the insulating seal member and the second electrode terminal in the inner peripheral side of the first electrode terminal, injecting a molten resin from a gate provided on the surface facing the second electrode terminal in the inner peripheral side of the mold into the mold, entering the injected resin along the surface of the inner peripheral side of the mold into the side of the second electrode terminal, guiding the resin hitting the bottom surface of the second electrode terminal to the rib of the second electrode terminal for the resin to backwardly flow in the direction of the gate, guiding the resin hitting the bottom surface of the gate side of the mold to the rib of the first electrode terminal for the resin to flow between both the electrode terminals, and allowing a part of the resin hitting the bottom surface of the gate side of the mold to flow in the outer peripheral side of the rib of the first electrode terminal.

7. A cap member for the electrical double layer capacitor according to claim 2, wherein the resin-molded article includes the glass fibers of small pieces which are oriented in the direction almost parallel to the axial direction of the container.

8. A cap member for the electrical double layer capacitor according to claim 1, wherein when the first electrode terminal is welded to the opening of the bottom-closed tubular container, the resin-molded article is formed so that a space is left between its end portion facing the side wall of the bottom-closed tubular container, and the welded portion of the electrode terminal and the opening.

* * * * *